United States Patent [19]
Tani et al.

[11] Patent Number: 5,197,804
[45] Date of Patent: Mar. 30, 1993

[54] RESISTANCE TEMPERATURE SENSOR

[75] Inventors: Hiroji Tani; Tsutomu Yokoi; Tohru Kasanami, all of Kyoto, Japan

[73] Assignee: Murata Manufacturing Co., Ltd., Japan

[21] Appl. No.: 614,623

[22] Filed: Nov. 16, 1990

[30] Foreign Application Priority Data

| Nov. 17, 1989 | [JP] | Japan | 1-300087 |
| Nov. 17, 1989 | [JP] | Japan | 1-300088 |
| Nov. 17, 1989 | [JP] | Japan | 1-300089 |

[51] Int. Cl.⁵ .......................... H01C 7/00; G01K 7/18
[52] U.S. Cl. ..................................... 374/185; 338/25; 338/28
[58] Field of Search ............. 374/185, 172; 338/22 R, 338/28, 29, 30, 237, 252, 25

[56] References Cited

U.S. PATENT DOCUMENTS

| 4,103,275 | 7/1978 | Diehl et al. | 338/28 |
| 4,129,848 | 12/1978 | Frank et al. | 374/185 |
| 4,418,329 | 11/1983 | Gruner | 338/28 |
| 4,649,364 | 3/1987 | Tanahashi et al. | 338/22 R |
| 5,053,740 | 10/1991 | Schultz et al. | 374/185 |

FOREIGN PATENT DOCUMENTS

| 112688 | 4/1975 | Fed. Rep. of Germany. | |
| 3806308 | 9/1989 | Fed. Rep. of Germany. | |
| 289127 | 11/1989 | Fed. Rep. of Germany. | |
| 0283102 | 11/1988 | Japan | 338/22 R |
| 0275601 | 11/1990 | Japan | 338/22 R |
| 0281704 | 11/1990 | Japan | 338/22 R |
| 8601290 | 2/1986 | PCT Int'l Appl. | |

Primary Examiner—William A. Cuchlinski, Jr.
Assistant Examiner—Diego F. F. Gutierrez
Attorney, Agent, or Firm—Ostrolenk, Faber, Gerb & Soffen

[57] ABSTRACT

A resistance film of platinum is formed on an insulating substrate of alumina. The resistance film is divided by grooves passing therethrough to provide a zigzag resistance circuit pattern, and the film forms a pair of terminal electrodes electrically connected to end portions of the resistance circuit pattern, respectively. In order to stop transmission of heat generated in the resistance circuit pattern to the terminal electrodes, gaps for stopping heat conduction are formed between the resistance circuit pattern and each of the terminal electrodes.

18 Claims, 12 Drawing Sheets

RESISTANCE TEMPERATURE SENSOR

BACKGROUND OF THE INVENTION

1. Field of the Invention

The present invention relates to a resistance temperature sensor, and more specifically to a resistance temperature sensor such as a platinum temperature sensor which makes use of the property that the resistance value of the resistance material changes dependent on temperature.

2. Description of the Background Art

FIG. 14 shows a conventional resistance temperature sensor 50 of interest to the present invention.

The resistance temperature sensor 50 comprises an insulating substrate 51 formed of alumina, on which a resistance circuit pattern 52a of platinum is formed. The resistance circuit pattern 52a is formed in the following manner.

A resistance film 52 of platinum is formed on the entire surface of the insulating substrate 51 by vapor deposition, sputtering, or printing and baking of a platinum paste, then grooves 53a are formed by dry etching, chemical etching or laser cutting, and thus a resistance circuit pattern 52a is formed in a zigzag pattern as shown in the figure. Grooves 53b are formed in the resistance film 52 along the peripheral edge of the insulating substrate 51 by a similar method. Even if the resistance film 52 peels off from end portions of the substrate, the peeling of the film is prevented at the grooves 53b, and thus the grooves 53b serves to prevent further peeling.

Terminal electrodes 54a and 54b are respectively formed by the resistance film 52 on the left and right sides of the resistance circuit pattern 52a. Conductive films 55a and 55b of gold, for example, are respectively formed on the terminal electrodes 54a and 54b. External terminals 56a and 56b formed of, for example, platinum clad wires are connected to the conductive films 55a and 55b by, for example, welding.

Portions of the external terminals 56a and 56b connected with the conductive films 55a and 55b may be coated with reinforcing layers 57 made of glass, for example, so that the connecting portions of the external terminals 56a and 56b are reinforced. Although the reinforcing layer 57 is not shown on the external terminal 56a on the left side, actually that terminal may also be coated with a reinforcing layer in the same way as the external terminal 56b on the right side.

Although not shown, a protective coat is formed on the insulating substrate 51 on which the resistance film 52 and the like are formed. The protective coat is formed of resin or glass, for example. It protects the resistance film 52 from moisture, waste, dust and so on and physically reinforces the resistance film 52. The reinforcing layers 57 may be formed simultaneously with the protective coat.

In the resistance temperature sensor 50 of FIG. 14, the resistance film 52 is formed entirely on the insulating substrate 51, and the resistance circuit pattern 52a and the terminal electrodes 54a and 54b can be easily and effectively formed by dry etching, chemical etching or laser cutting, so that the time required for manufacturing can be reduced.

Generally, the resistance circuit pattern 52a of the resistance temperature sensor 50 is heated to a constant temperature by letting a current flow through the external terminals 56a and 56b. When a flow rate of air is to be measured, for example, the resistance temperature sensor 50 is positioned in the flow path of the air. When the flow rate changes, the thermal equilibrium state is changed, and the amount of change is measured by a known bridge circuit.

However, in the resistance temperature sensor 50 shown in FIG. 14, the resistance circuit pattern 52a and the terminal electrodes 54a and 54b are formed continuously, and in addition they are formed of a material having high heat conductivity such as platinum. Consequently, heat generated in the resistance circuit pattern 52a is readily transmitted to the terminal electrodes 54a and 54b, and further to the external terminals 56a and 56b. Consequently, heat is retained not only in the resistance circuit pattern 52a but also in the terminal electrodes 54a, 54b, the reinforcing layers 57, and the external terminals 56a and 56b, increasing the thermal capacity of the resistance temperature sensor 50 as a whole, so that the speed of response to a change in the flow rate becomes slower.

SUMMARY OF THE INVENTION

Therefore, an object of the present invention is to provide a resistance temperature sensor having superior response characteristics to a change in temperature.

The resistance temperature sensor of the present invention comprises an insulating substrate. A resistance film is formed on the insulating substrate. The resistance film is divided by grooves passing therethrough, to provide a zigzag resistance circuit pattern. A pair of terminal electrodes are formed on the insulating substrate to connect a pair of external terminals, respectively. Each of the pair of terminal electrodes is electrically connected to each of end portions of the resistance circuit pattern, respectively. A gap for stopping heat conduction is formed between each of the pair of terminal electrodes and the resistance circuit pattern.

According to the present invention, heat transmission from the resistance circuit pattern to the terminal electrodes is suppressed by the gap, so that the thermal capacity of the resistance temperature sensor as a whole can be made smaller. Consequently, the thermal response characteristics of the resistance temperature sensor can be improved.

When the resistance temperature sensor is attached to a base or a holder, the difference between the temperature of the resistance circuit pattern and the temperature of the portion of attachment should preferably be set higher than 100° C., in order to prevent the temperature difference from affecting the thermal response characteristic. The gap formed between the resistance circuit pattern and the terminal electrode in the present invention facilitates provision of such a temperature difference.

The pair of terminal electrodes are preferably formed by the resistance film constituting the resistance circuit pattern. The resistance circuit pattern and the terminal electrodes are electrically connected by portions of the resistance film. The resistance circuit pattern and the terminal electrodes may be electrically connected by lead wires.

The gap is preferably provided by a region where the resistance film is not formed. Alternatively, the gap may be provided by a plurality of grooves formed in the resistance film.

The foregoing and other objects, features, aspects and advantages of the present invention will become

DESCRIPTION OF THE PREFERRED EMBODIMENTS

Figure 1:
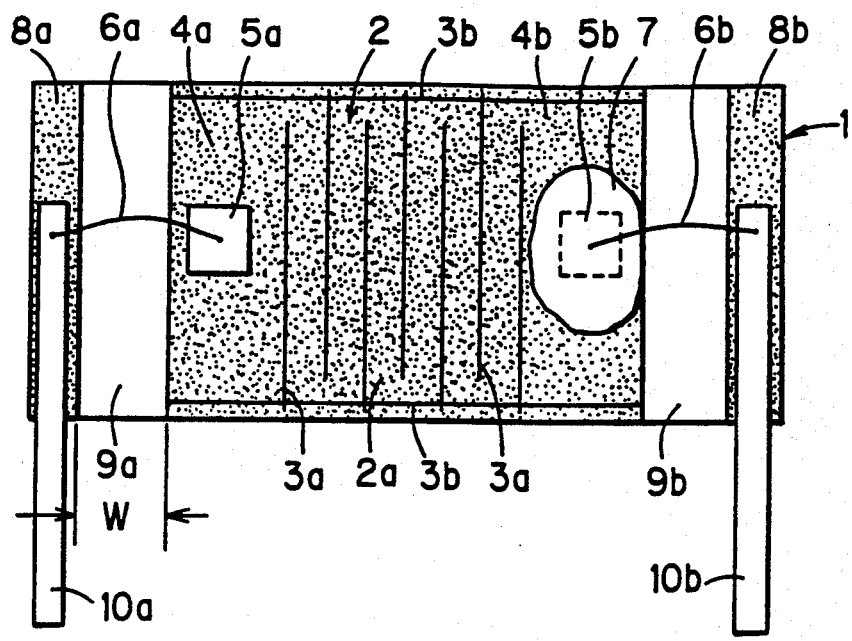
FIG. 1 is a plan view showing a resistance temperature sensor in accordance with the first embodiment of the present invention.
Figure 14:
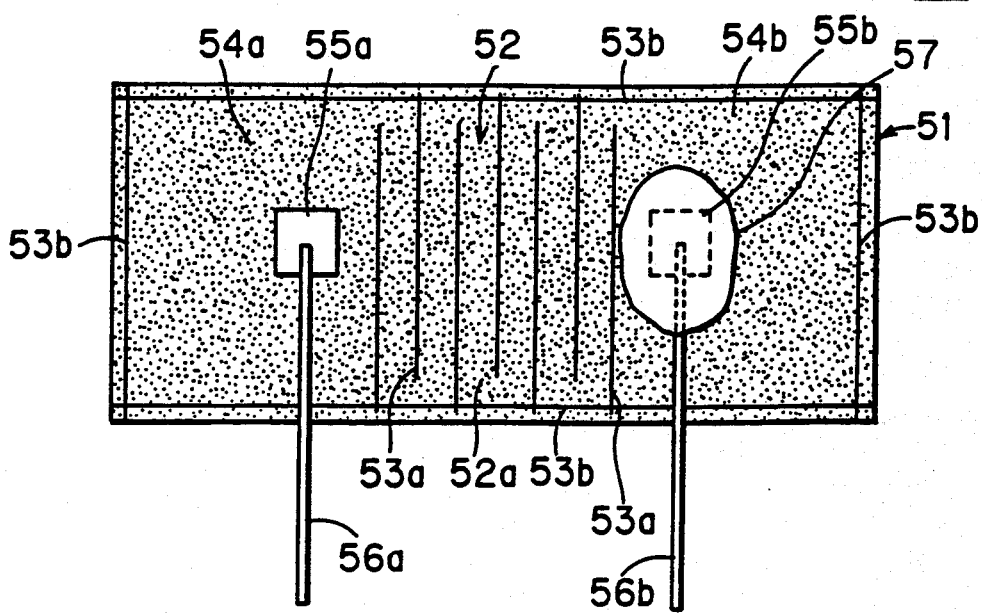
FIG. 14 is a plan view showing a conventional resistance temperature sensor.

Referring to FIG. 1, a resistance temperature sensor 61 has an insulating substrate 1 formed of, for example, alumina, and a resistance circuit pattern 2a of platinum, for example, is formed on the insulating substrate 1. The resistance circuit pattern 2a is formed in the following manner, for example.

A resistance film 2 of platinum is formed entirely on the insulating substrate 1 by vapor deposition, sputtering, or by printing and baking of a platinum paste, then grooves 3a are formed by dry etching, chemical etching or laser cutting, so that a resistance circuit pattern 2a is provided extending in a zigzag pattern as shown in the figure. By the same method, grooves 3b are formed along the peripheral edge of the insulating substrate 1. Even if the resistance film 2 is peeled off from end portions of the substrate, the peeling is stopped at the grooves 3b, and further peeling is prevented by the grooves.

Lead-out electrodes 4a and 4b are formed on the left and right sides of the resistance circuit pattern 2a. Conductive films 5a and 5b formed of a metal such as gold, gold-platinum, silver, silver-palladium, silver-platinum, nickel or copper are formed on the lead-out electrodes 4a and 4b, respectively. Lead wires 6a and 6b each formed of a gold wire, platinum wire or platinum clad wire are connected to the conductive films 5a and 5b, respectively, by welding, for example. It may or may not be necessary to form the conductive films 5a and 5b. That is, the leads 6a and 6b may be directly connected to the lead-out electrodes 4a and 4b by soldering, for example.

Connecting portions of the lead wires 6a and 6b with the lead-out electrodes 4a and 4b may be coated with reinforcing layers 7 of glass or resin, for example, so that the connecting portions are reinforced. Although the reinforcing layer 7 is not shown on the left side lead wire 6a, it may be actually coated with a reinforcing layer, in the same way as is the right side lead wire 6b.

End electrodes 8a and 8b, which will be the terminal electrodes, are formed on left and right end portions of the insulating substrate 1. The end electrodes 8a and 8b are provided by the above described resistance film 2. Regions where the resistance film 2 is not formed, that is, gaps 9a and 9b are provided to stop heat transmission between the end electrodes 8 and 8b and the lead-out electrodes 4a and 4b, respectively.

The end electrodes 8a and 8b may be formed of silver-palladium, silver-platinum or the like instead of the resistance film 2.

External terminals 10a and 10b formed of metal plates having relatively large sectional area and thus having relatively large physical strength are attached to end electrodes 8a and 8b. These external terminals 10a and 10b are used to attach the resistance temperature sensor 61 to an appropriate attaching base (not shown).

The lead wires 6a and 6b extending from the lead-out electrodes 4a and 4b may be electrically connected directly to a measuring circuit. Alternatively, the lead wires 6a and 6b may be connected to the external terminals 10a and 10b, respectively, as shown in the figure, and the external terminals 10a and 10b are electrically connected to the measuring circuit. The lead wires 6a and 6b may be connected to the end electrodes 8a and 8b, respectively, instead of the external terminals 10a and 10b.

The width W of each of the gaps 9a and 9b is set such that the temperature difference between the lead-out electrodes 4a and 4b and the end electrodes 8a and 8b exceeds 100° C. If the temperature difference is not higher than 100° C., the temperature at the end electrodes 8a and 8b remains high, and heat is substantially reserved near the end electrodes 8a and 8b, enlarging the thermal capacity of the resistance temperature sensor 61, which degrades the thermal response characteristic.

Although not shown, a protective coat may be formed to cover the region of the insulating substrate 1 on which the resistance film 2 is formed. The protective coat is formed of, for example, resin or glass applied on a prescribed region of the insulating substrate 1 by printing, a spray or a spinner, and by firing the same. The protective coat protects the resistance film 2 from moisture, waste, dust and the like and physically reinforces the resistance film 2. The reinforcing layer 7 may be formed simultaneously with the protective coat.

Figure 5:
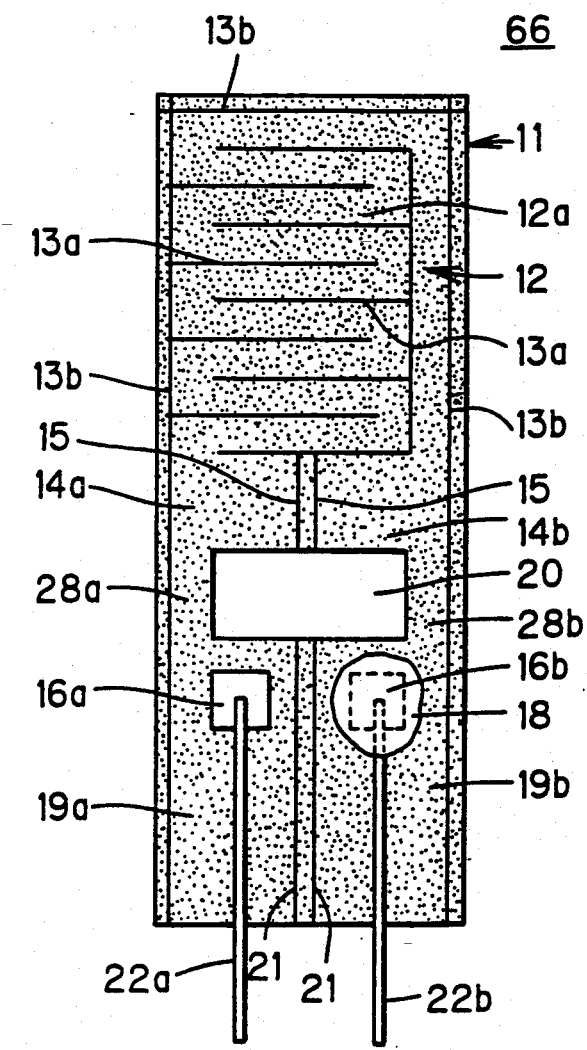
FIG. 5 is a plan view showing a resistance temperature sensor in accordance with the fifth embodiment of the present invention.

In an alternate embodiment shown in FIG. 5, compared with the resistance temperature sensor, 61, the resistance temperature sensor 62 has a vertical body, with the resistance circuit pattern positioned on the upper side as viewed, and the lower side is for attachment.

The resistance temperature sensor 62 comprises an insulating substrate 11 formed of, for example, alumina. A resistance circuit pattern 12a is formed on the insulating substrate 11 by dry etching, chemical etching or laser cutting a resistance film 12 of, for example, platinum and by dividing the same with grooves 13a to provide a zigzag pattern. Grooves 13b are formed in the resistance film 12 along the peripheral edge of the insulating substrate 11. The grooves 13b have the same function as the grooves 3b of FIG. 1.

Lead-out electrodes 14a and 14b extending continuous from respective end portions of the resistance circuit pattern 12a are formed adjacent to a lower portion of the region where the resistance circuit pattern 12a is formed. The lead-out electrodes 14a and 14b are separated from each other by grooves 15 formed in the resistance film 12, so that they are not connected electrically with each other. In the alternate embodiment of FIG. 15, two grooves 15 are formed. The number of grooves 15 may be one, or more. When two or more grooves 15 are formed, the possibility of electrical short between the lead-out electrodes 14a and 14b can be made smaller.

Conductive films 16a and 16b of gold, gold-platinum, silver, silver-palladium, silver-platinum, nickel or copper are formed on the lead-out electrodes 14a and 14b, respectively. Lead wires 17a and 17b of gold, platinum or platinum clad wire are connected to the conductive films 16a and 16b, respectively, by welding, for example. As described with reference to the embodiment of FIG. 1, the conductive films 16a and 16 are not always necessary.

Connecting portions between the lead wires 17a and 17b and the lead-out electrodes 14a and 14b may be coated with reinforcing layers 18 formed of glass or resin. The function of the reinforcing layers 18 is the same as that of the reinforcing layers 7 shown in FIG. 1. Although the reinforcing layer 18 is not shown on the connecting portion of the left side lead wire 17a, it is actually coated with the reinforcing layer in the same way as the right side lead wire 17b. The reinforcing layer 18 may be formed to integrally cover the connecting portions of the two lead wires 17a and 17b.

End electrodes 19a and 19b which will be the terminal electrodes are formed on the lower end portion of the insulating substrate 11. The end electrodes 19a and 19b are formed by the resistance film 12 constituting the resistance circuit pattern 12a. A region where the resistance film 12 is not formed, that is, a gap 20 is formed to stop heat conduction between the end electrodes 19a and 19b and the lead-out electrodes 14a and 14b. The end electrodes 19a and 19b are electrically separated from each other by, for example, two grooves 21.

The end electrodes 19a and 19b may be formed of silver-palladium, silver-platinum or the like instead of the resistance film 12.

External terminals 22a and 22b are attached to the end electrodes 19a and 19b, respectively. The external terminals 22a and 22b are used for attaching the resistance temperature sensor to an appropriate attaching base. For this purpose, the external terminals 22a and 22b are formed of metal plates having a relatively large sectional area and therefore high physical strength.

The lead wires 17a and 17b extending from the lead-out terminals 14a and 14b, respectively, may be directly connected electrically to a measuring circuit. When the external terminals 22a and 22b are electrically connected to the measuring circuit, the lead wires 17a and 17b are connected to the external terminals 22a and 22b, as shown in the figure. The lead wires 17a and 17b may be connected to the end electrodes 19a and 19b and not to the external terminals 22a and 22b, respectively.

Figure 15:
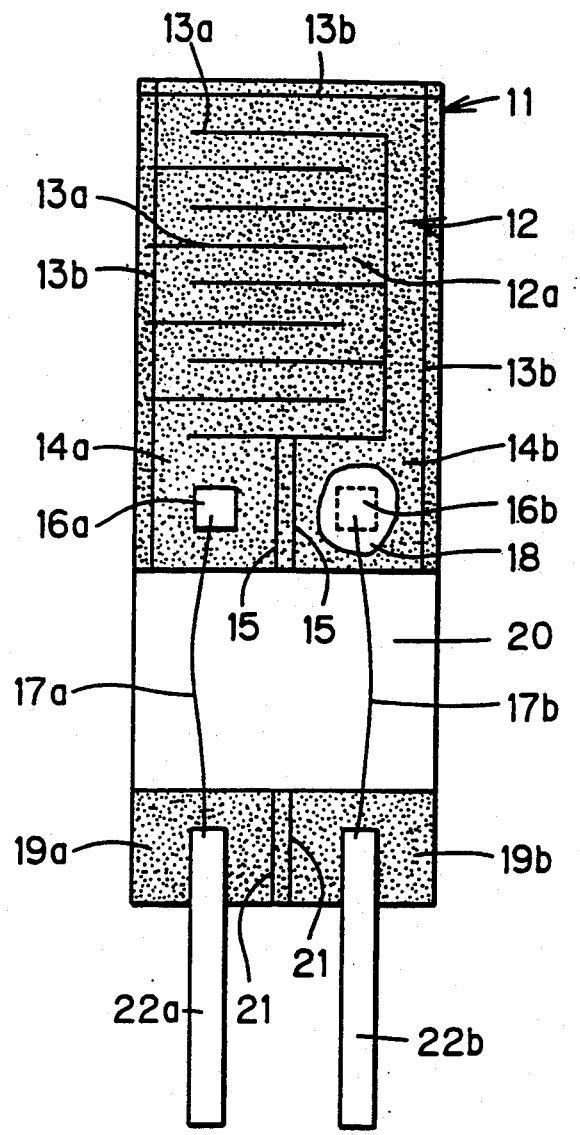
FIG. 15 is a plan view showing a resistance temperature sensor in accordance with an alternate embodiment of the invention.

Although not shown, a protective coat may be formed to cover the insulating substrate 11 of the resistance temperature sensor 62 of the alternate embodiment of FIG. 15, as in the case of the resistance temperature sensor 61 of FIG. 1.

The size of the gap 20 of the resistance temperature sensor 62 is set in the same manner as the width W of each of the gaps 9a and 9b of FIG. 1.

Further embodiments of the present invention will be described with reference to FIGS. 2 to 13. In these figures, elements corresponding to those shown in FIG. 1 or 15 are denoted by the same reference characters and descriptions thereof are not repeated.

Figure 2:
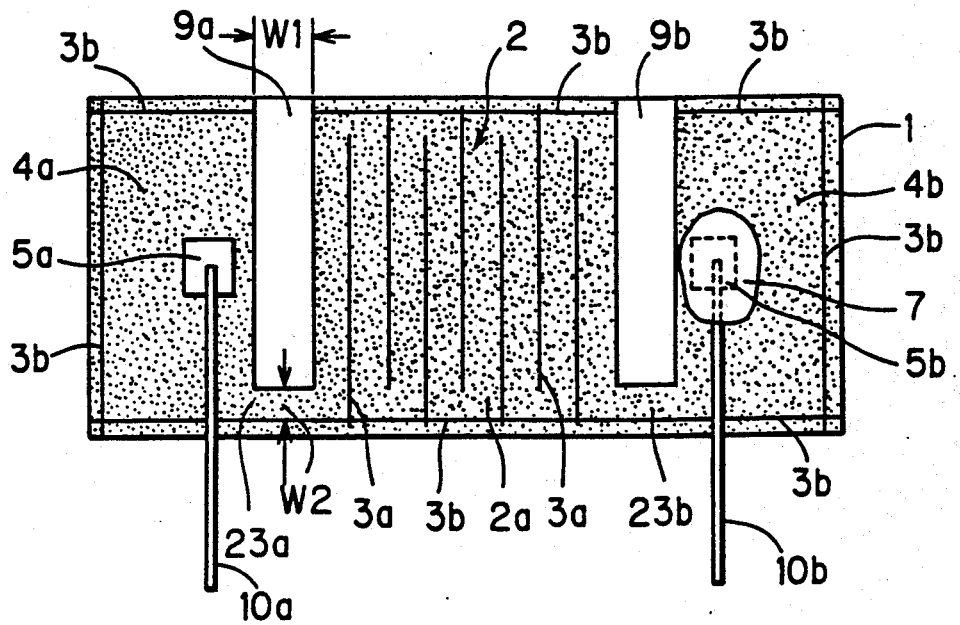
FIG. 2 is a plan view showing a resistance temperature sensor in accordance with the second embodiment of the present invention.

FIG. 2 shows a resistance temperature sensor 63 similar to the resistance temperature sensor 61 shown in FIG. 1.

Compared with the resistance temperature sensor 61 shown in FIG. 1, the resistance temperature sensor 63 has gaps 9a and 9b formed between the resistance circuit pattern 2a and the lead-out electrodes 4a and 4b. End portions of the resistance circuit pattern 2a are connected to the lead-out electrodes 4a and 4b by connecting electrodes 23a and 23b provided by the resistance film 2, respectively.

The resistance temperature sensor 63 does not comprise elements corresponding to the end electrodes 8a and 8b and the lead wires 6a and 6b shown in FIG. 1. Therefore, the lead-out electrodes 4a and 4b serve as terminal electrodes to connect the external terminals 10a and 10b.

In this embodiment, the external terminals 10a and 10b are formed of relatively thin metal wires or bars.

The width W1 of each of the gaps 9a and 9b is set in the same manner as the width W shown in FIG. 1. The width W2 of each of the connecting electrodes 23a and 23b is preferably set in the following manner. Namely, the width W2 is set to be the same as or larger than the width of the resistance circuit pattern 2a and to be large enough to create a temperature difference between the resistance circuit pattern 2a and the lead-out electrodes 4a and 4b larger than 100° C. The reason for this is that if the width W2 is narrower than that of the resistance circuit pattern 2a, the connecting electrodes 23a and 23b are heated to a temperature higher than the resistance circuit pattern 2a, thus the heat is transmitted to the lead-out electrodes 4a and 4b and to the external terminals 10a and 10b, degrading the thermal response characteristic.

Although not shown, end portions of the resistance circuit pattern 2a and the lead-out electrodes 4a and 4b may be connected to each other by lead wires. In that case, the connecting electrodes 23a and 23b are not necessary.

Figure 3:
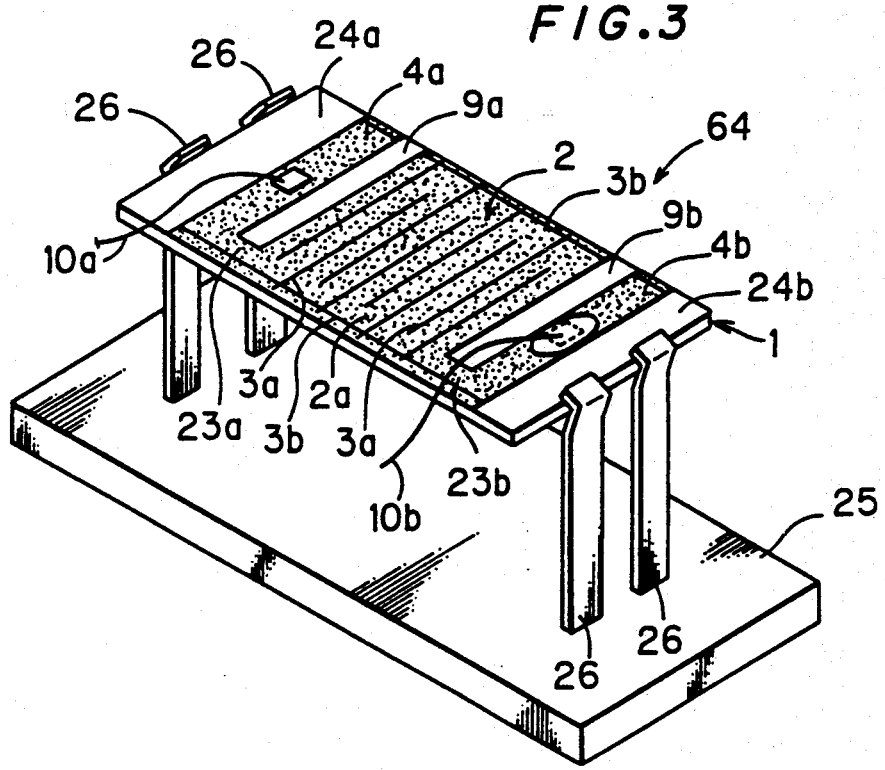
FIG. 3 is a plan view showing a resistance temperature sensor in accordance with the third embodiment of the present invention.

FIG. 3 shows a resistance temperature sensor 64 similar to the resistance temperature sensor 63 shown in FIG. 2.

Compared with the resistance temperature sensor 63 shown in FIG. 2, the resistance temperature sensor 64 is characterized in that regions 24a and 24b where the resistance film is not formed are provided on both end portions of the insulating substrate 1.

This resistance temperature sensor 64 is attached to an attaching base 25. More specifically, a plurality of holding pieces 26 are provided on the attaching base 25, and the insulating substrate 1 is resiliently clamped by the holding pieces 26. The holding pieces 26 are in contact with the insulating substrate 1 at the regions 24a and 24b where the resistance film is not formed.

In this embodiment, the heat of the resistance temperature sensor 64 can be suppressed from being transmitted to the holding pieces 26, by the existence of the regions 24a and 24b in addition to the gaps 9a and 9b.

Figure 4:
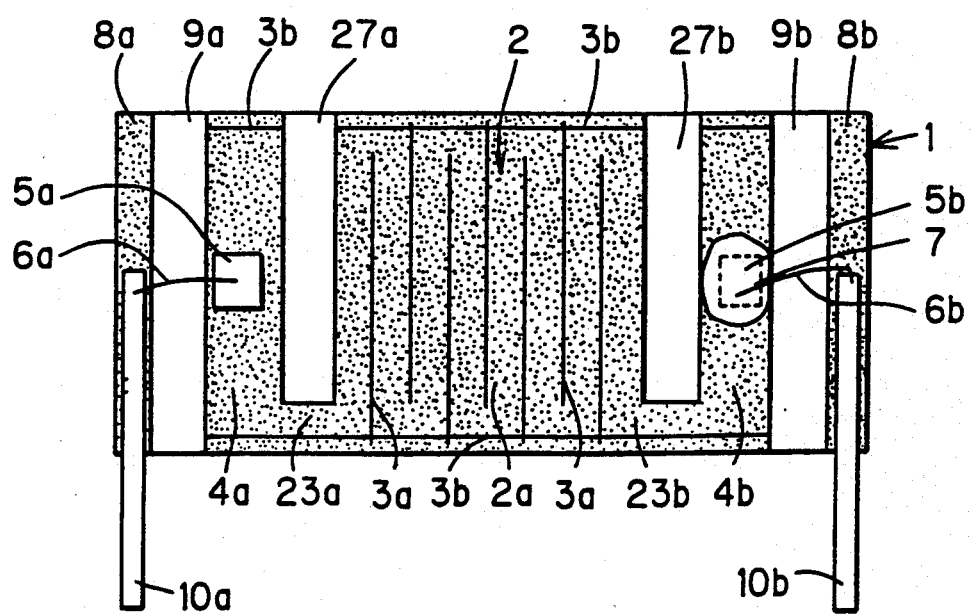
FIG. 4 is a perspective view showing a resistance temperature sensor in accordance with the fourth embodiment of the present invention.

FIG. 4 shows a resistance temperature sensor 65 similar to the resistance temperature sensor 61 of FIG. 1 and the resistance temperature sensor 63 of FIG. 2.

Compared with the resistance temperature sensor 61 of FIG. 1, the resistance temperature sensor 65 is characterized in that second gaps 27a and 27b are formed between the resistance circuit pattern 2a and the lead-out electrodes 4a and 4b.

By this embodiment, transmission of heat generated in the resistance circuit pattern 2a to the external terminals 10a and 10b can be more effectively suppressed, since the second gaps 27a and 27b are provided in addition to the gaps 9a and 9b.

FIG. 5 shows a resistance temperature sensor 66 similar to the further embodiment of a resistance temperature sensor having a vertical body, described above, for example in connection with FIG. 15.

Compared with the resistance temperature sensor having a vertical body as in the embodiment of FIG. 15, the resistance temperature sensor 66 is characterized in that the gap 20 is not formed over the entire width of the insulating substrate 11. Therefore, connecting electrodes 28a and 28b corresponding to the lead wires 17a and 17b of FIG. 15 are provided by the resistance film 12.

In addition, conductive films 16a and 16b are formed on the end electrodes 19a and 19b, respectively. External terminals 22a and 22b each formed of a gold wire, platinum wire or platinum clad wire are connected to the conductive films 16a and 16b, respectively.

Figure 6:
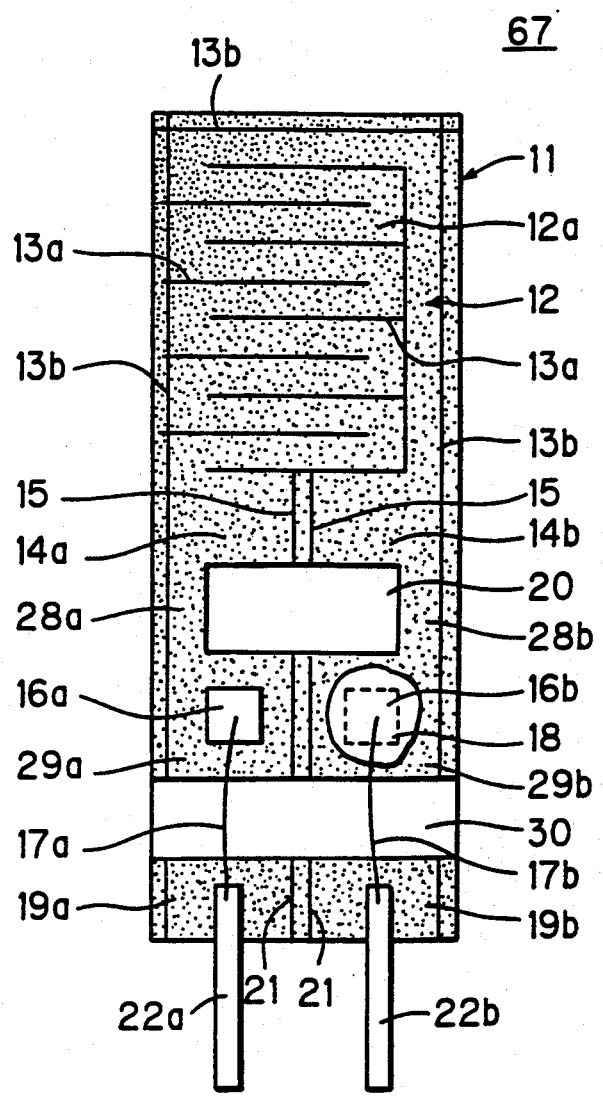
FIG. 6 is a plan view showing a resistance temperature sensor in accordance with the sixth embodiment of the present invention.

FIG. 6 shows a resistance temperature sensor 67 similar to the resistance temperature sensor 62 of FIG. 15 and the resistance temperature sensor 66 of FIG. 5.

The resistance temperature sensor 67 is different from the resistance temperature sensor 66 of FIG. 5 in that the formation of the end electrodes 19a and 19b is different. More specifically, a second gap 30 is formed between the end electrodes 19a and 19b and the lead-out electrodes 14a and 14b, to provide intermediate electrodes 29a and 29b. Conductive films 16a and 16b are formed on the intermediate electrodes 29a and 29b, and lead wires 17a and 17b are connected to the conductive films 16a and 16b, respectively.

External terminals 22a and 22b each formed of a metal plate having a relatively large sectional area and therefore a higher physical strength are attached to the end electrodes 19a and 19b. The lead wires 17a and 17b are connected to the external terminals 22a and 22b, respectively. The external terminals 22a and 22b are used to attach the resistance temperature sensor 67 to an appropriate attaching base.

Figure 7:
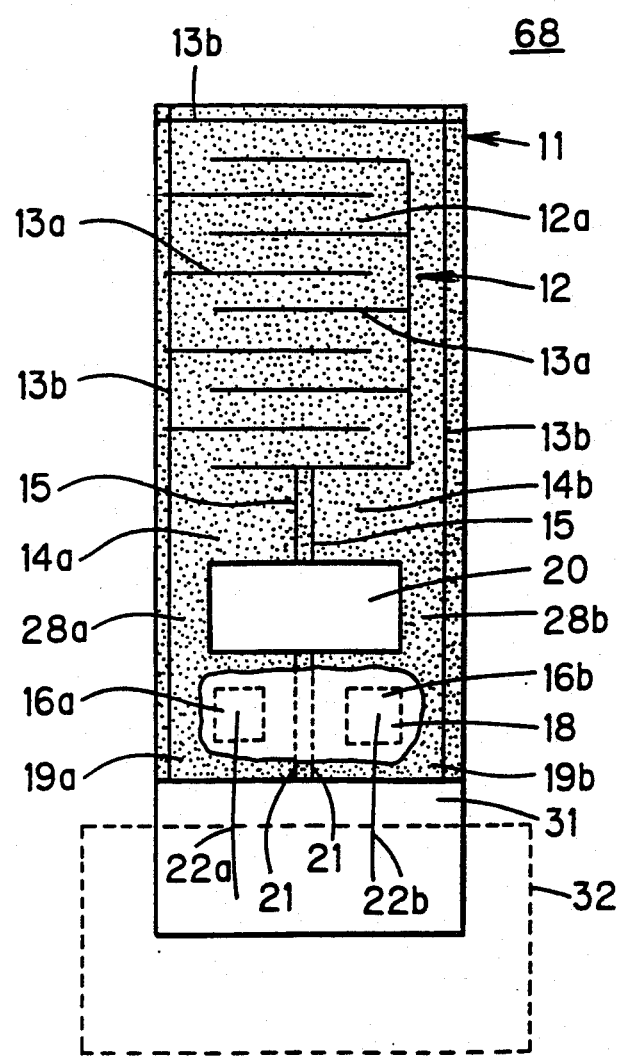
FIG. 7 is a plan view showing a resistance temperature sensor in accordance with the seventh embodiment of the present invention.

FIG. 7 shows a resistance temperature sensor 68 similar to the resistance temperature sensor 66 of FIG. 5 and the resistance temperature sensor 67 of FIG. 6.

Compared with the resistance temperature sensor 67 shown in FIG. 6, the resistance temperature sensor 68 is characterized in that the intermediate electrodes 29a and 29b of FIG. 6 serve as the end electrodes 19a and 19b, and that the lead wires 17a and 17b of FIG. 6 serve as the external terminals 22a and 22b. A region 31 corresponding to the second gap 30 of FIG. 6 extends to a lower end portion of the insulating substrate 11. Namely, the resistance film is not formed in the region 31. In addition, the reinforcing layer 18 is formed to cover both of the conductive films 16a and 16b.

The resistance temperature sensor 68 is held in a holder 32 by inserting the lower end portion of the insulating substrate 11 to a groove (not shown) provided in the holder 32 shown by broken lines in FIG. 7.

According to this embodiment, the holder 32 is in contact with the insulating substrate 11 at the region 31 where the resistance film is not formed, and therefore heat conduction from the resistance temperature sensor 68 to the holder 32 can be suppressed.

Figure 8:
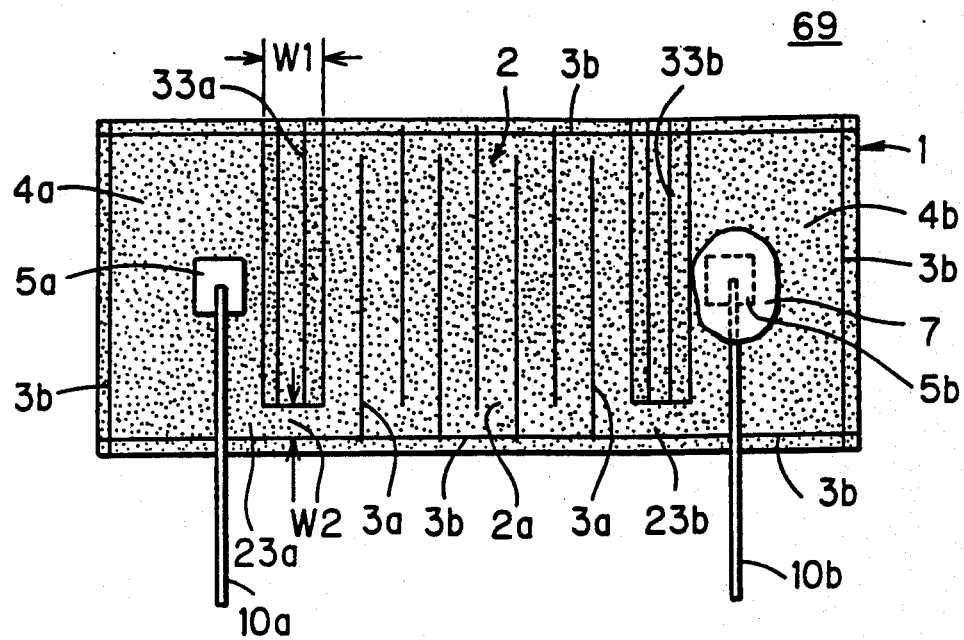
FIG. 8 is a plan view showing a resistance temperature sensor in accordance with the eighth embodiment of the present invention.

FIG. 8 shows a resistance temperature sensor 69 similar to the resistance temperature sensor 63 of FIG. 2.

In the resistance temperature sensor 69, a plurality of grooves 33a and 33b are provided instead of the gaps 9a and 9b of FIG. 2, respectively. Heat conduction from the resistance circuit pattern 2a to the lead-out electrodes 4a and 4b can be stopped by the plurality of grooves 33a and 33b.

In the following embodiments shown in FIGS. 9 to 13, at least one gap in the above described related embodiments are formed by a plurality of grooves, as in the embodiment of FIG. 8 related to the embodiment of FIG. 2.

Figure 9:
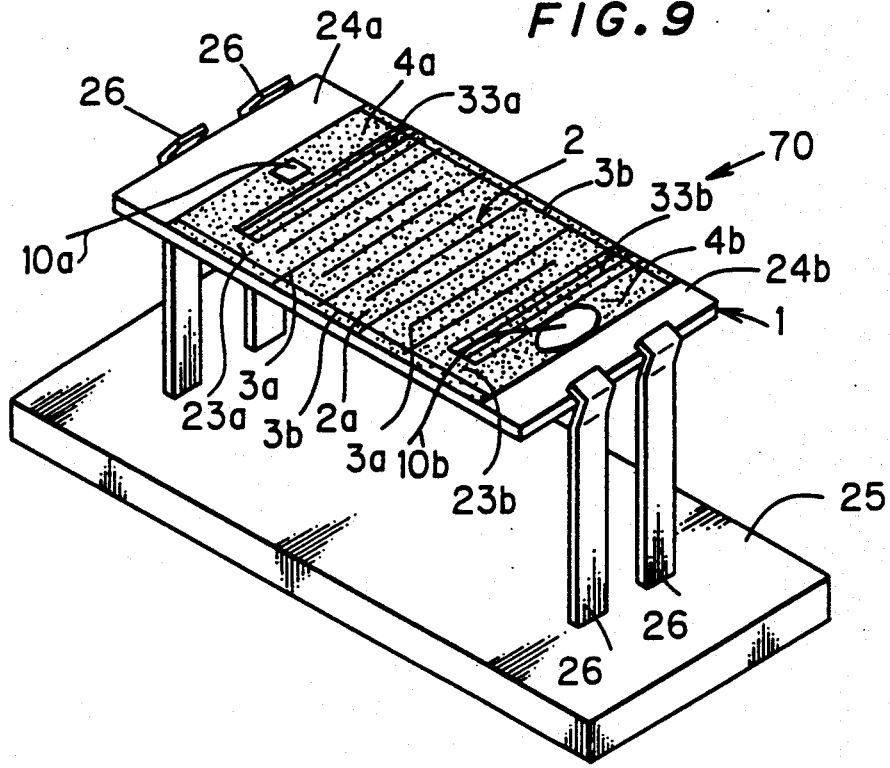
FIG. 9 is a plan view showing a resistance temperature sensor in accordance with the ninth embodiment of the present invention.

The resistance temperature sensor 70 shown in FIG. 9 comprises a plurality of grooves 33a and 33b instead of the gaps 9a and 9b of FIG. 3.

Figure 10:
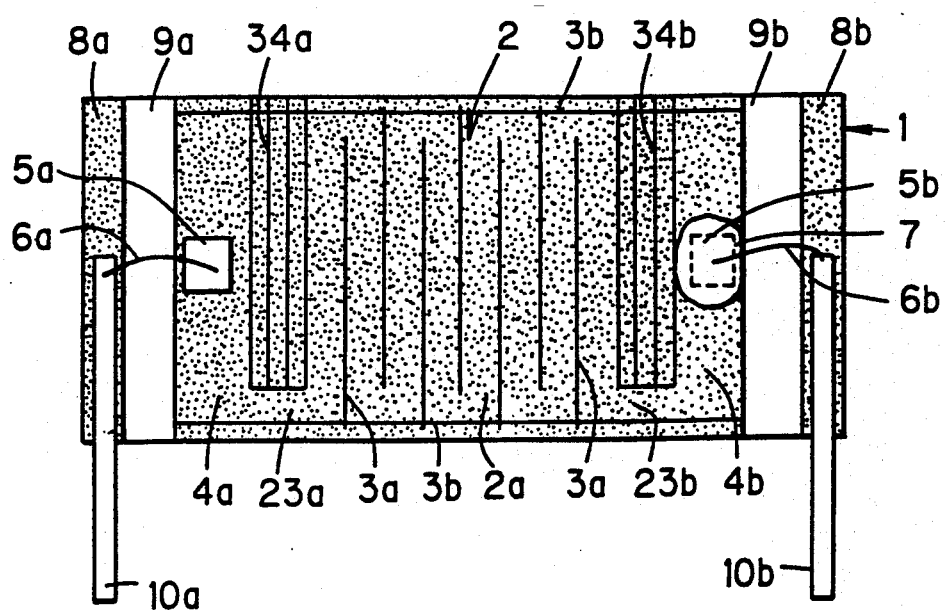
FIG. 10 is a perspective view showing a resistance temperature sensor in accordance with the tenth embodiment of the present invention.

The resistance temperature sensor 71 shown in FIG. 10 comprises a plurality of grooves 34a and 34b instead of the second gaps 27a and 27b of FIG. 4.

Figure 11:
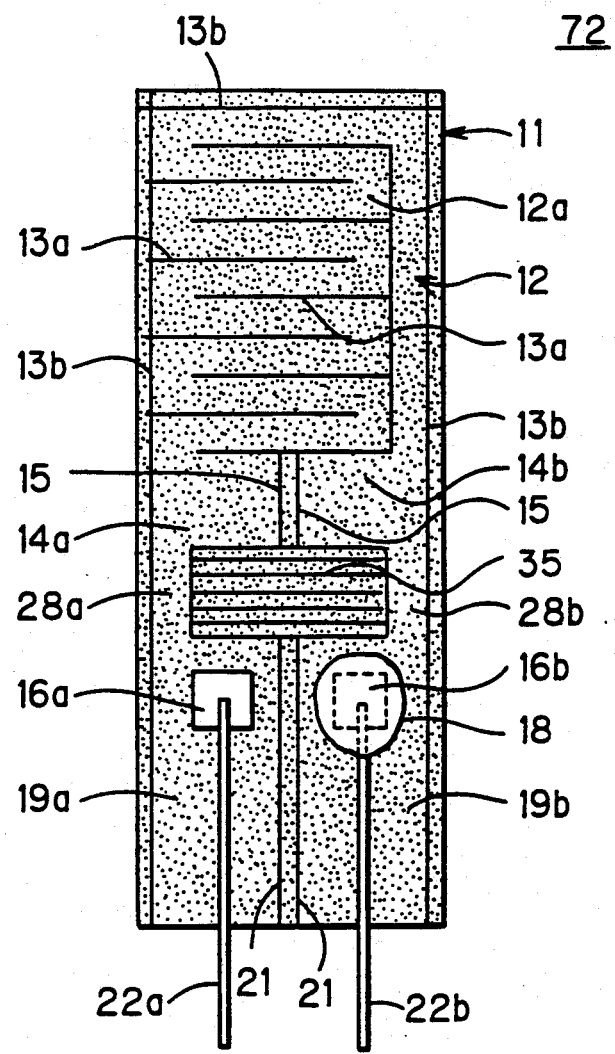
FIG. 11 is a plan view showing a resistance temperature sensor in accordance with the eleventh embodiment of the present invention.

The resistance temperature sensor 72 shown in FIG. 11 comprises a plurality of grooves 35 instead of the gap 20 of FIG. 5.

Figure 12:
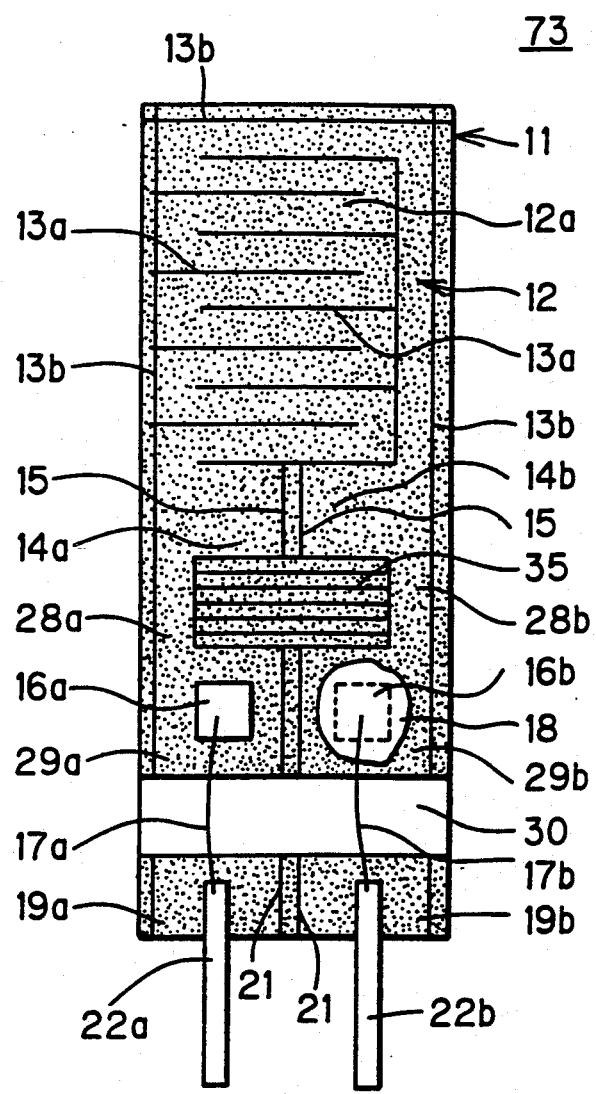
FIG. 12 is a plan view showing a resistance temperature sensor in accordance with the twelfth embodiment of the present invention.

The resistance temperature sensor 73 shown in FIG. 12 comprises a plurality of grooves 35 instead of the gap 20 of FIG. 6.

Figure 13:
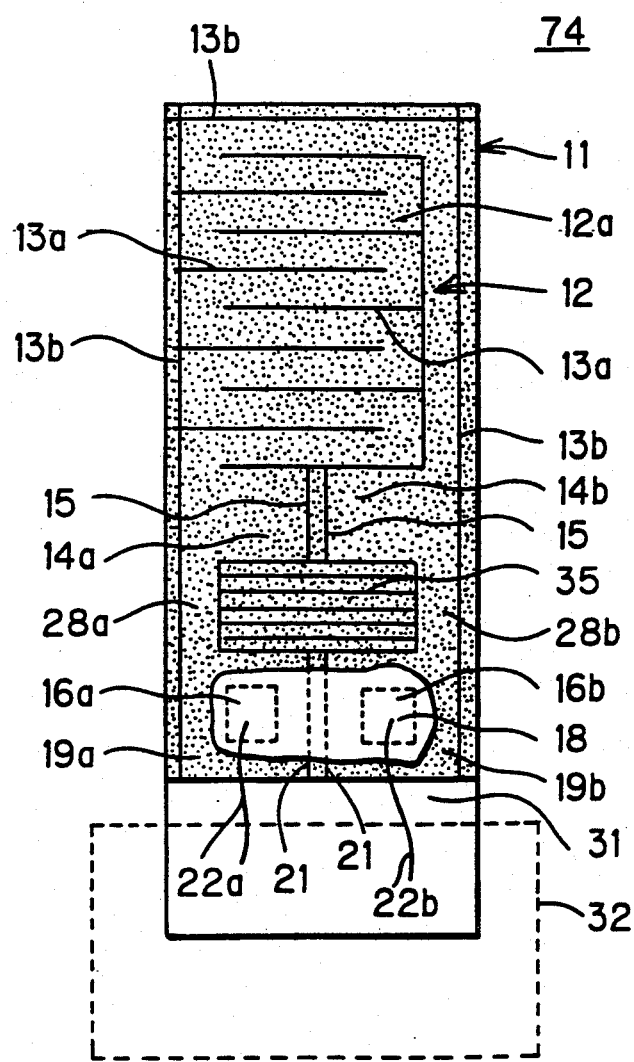
FIG. 13 is a plan view showing a resistance temperature sensor in accordance with the thirteenth embodiment of the present invention.

The resistance temperature sensor 74 shown in FIG. 13 comprises a plurality of grooves 35 instead of the gap 20 of FIG. 7.

Although the present invention has been described and illustrated in detail, it is clearly understood that the same is by way of illustration and example only and is not to be taken by way of limitation, the scope of the present invention being limited only by the terms of the appended claims.

What is claimed is:

1. A resistance temperature sensor, comprising:
   an insulating substrate;
   a resistance film formed on said insulating substrate divided by a groove passing therethrough to form a zigzag resistance circuit pattern;
   a pair of terminal electrodes formed on said insulating substrate and connected to a pair of external terminals formed on said insulating substrate;

means for electrically connecting each of said pair of terminal electrodes to a respective end portion of said resistance circuit pattern; and means for forming at least one gap on said insulating substrate between each of the pair of terminal electrodes and said resistance circuit pattern to stop heat conduction between each of said pair of terminal electrodes and said resistance circuit pattern.

2. A resistance temperature sensor according to claim 1, wherein
said insulating substrate is formed of alumina.

3. A resistance temperature sensor according to claim 1, wherein
said resistance film is formed of platinum.

4. A resistance temperature sensor according to claim 1, wherein
said groove passing through said resistance film is formed after formation of said resistance film.

5. A resistance temperature sensor according to claim 1, wherein
said pair of terminal electrodes are formed of the same material as said resistance film constituting said resistance circuit pattern.

6. A resistance temperature sensor according to claim 5, wherein
each of said terminal electrodes is located at an end portion of said insulating substrate.

7. A resistance temperature sensor according to claim 5, wherein
said means for electrically connecting is provided by a part of said resistance film and each of said terminal electrodes is provided by said resistance film extending continuously from each of the end portions of said resistance circuit pattern.

8. A resistance temperature sensor according to claim 5, wherein
a region where said resistance film is not formed is provided on an end portion of said insulating substrate.

9. A resistance temperature sensor according to claim 1, wherein
said means for electrically connecting is provided by a lead wire.

10. A resistance temperature sensor according to claim 1, wherein
said means for forming said at least one gap forms at least two gaps between said resistance circuit pattern and each of said terminal electrodes.

11. A resistance temperature sensor according to claim 5, wherein
said means for forming at least one gap is provided by a region where said resistance film is not formed.

12. A resistance temperature sensor according to claim 5, wherein
said means for forming at least one gap is provided by a plurality of grooves formed in said resistance film.

13. A resistance temperature sensor according to claim 1, wherein
said means for forming at least one gap provides a temperature difference larger than 100° C. on both sides of the gap.

14. A resistance temperature sensor according to claim 1, wherein
said terminal electrodes are positioned on opposite end portions of said insulating substrate.

15. A resistance temperature sensor according to claim 1, wherein
both of said terminal electrodes are located on one end portion of said insulating substrate.

16. A resistance temperature sensor according to claim 1, wherein said means for forming at least one gap are formed in electrically conductive material on said insulating substrate, said electrically conductive material forming said pair of terminal electrodes and said resistance circuit pattern.

17. A resistance temperature sensor according to claim 16, wherein said pair of terminal electrodes are formed of the same material as said resistance film constituting said resistance circuit pattern.

18. A resistance temperature sensor, comprising;
an insulating substrate;
a resistance film formed on said insulating substrate divided by a groove passing therethrough to form a zigzag resistance circuit pattern;
a pair of terminal electrodes formed on said insulating substrate and connected to a pair of external terminals formed on said insulating substrate, each of said terminal electrodes being located at an end portion of said insulating substrate, and said pair of terminal electrodes being formed of the same material as said resistance film constituting said resistance circuit pattern;
means for electrically connecting each of said pair of terminal electrodes to a respective end portion of said resistance circuit pattern; and
means for forming at least one gap on said insulating substrate between each of the pair of terminal electrodes and said resistance circuit pattern to stop heat conduction between each of said pair of terminal electrodes and said resistance circuit pattern.

* * * * *